United States Patent
Shamoon

(10) Patent No.: US 7,878,493 B2
(45) Date of Patent: Feb. 1, 2011

(54) CUTTING BOARD SCOOP

(76) Inventor: Ellis N. Shamoon, 2833 Park Bridge Ct., Dallas, TX (US) 77219

( * ) Notice: Subject to any disclaimer, the term of this patent is extended or adjusted under 35 U.S.C. 154(b) by 771 days.

(21) Appl. No.: 11/876,335

(22) Filed: Oct. 22, 2007

(65) Prior Publication Data

US 2008/0237960 A1 Oct. 2, 2008

Related U.S. Application Data

(63) Continuation-in-part of application No. 29/278,433, filed on Mar. 29, 2007, now Pat. No. Des. 553,452.

(51) Int. Cl.
*B23Q 3/00* (2006.01)
(52) U.S. Cl. .................. 269/289 R; 269/302.1
(58) Field of Classification Search ............. 269/289 R, 269/302.1
See application file for complete search history.

(56) References Cited

U.S. PATENT DOCUMENTS

| | | | |
|---|---|---|---|
| D292,366 S | 10/1987 | Kuether et al. | |
| D339,722 S | 9/1993 | Ancona et al. | |
| 5,527,022 A * | 6/1996 | Gibson | 269/13 |
| 5,580,037 A * | 12/1996 | Gore | 269/54.5 |
| 6,460,841 B1 * | 10/2002 | Durr | 269/289 R |
| 6,536,753 B1 | 3/2003 | Keener | |
| D498,991 S | 11/2004 | Goggin | |
| D500,645 S | 1/2005 | Goggin | |
| D500,940 S | 1/2005 | Goggin | |
| 7,077,392 B2 | 7/2006 | Siegel et al. | |
| 2008/0237960 A1 * | 10/2008 | Shamoon | 269/289 R |

OTHER PUBLICATIONS

Dexas "Cut & Scoop" cutting board, Dec. 1980, photos A-F.
Dexas "Cut & Scoop a la carte", Dec. 1995, photos G-K.

* cited by examiner

*Primary Examiner*—Lee D Wilson
(74) *Attorney, Agent, or Firm*—Daniel V. Thompson

(57) ABSTRACT

A cutting board has a main cutting surface and a handle extending from the main cutting surface and vertically spaced above the main cutting surface.

8 Claims, 4 Drawing Sheets

CUTTING BOARD SCOOP

CROSS REFERENCE TO RELATED APPLICATION

This is a continuation-in-part of U.S. Design patent application Ser. No. 29/278,433 filed Mar. 29, 2007, which will issue as D553,452 on Oct. 23, 2007.

FIELD OF THE INVENTION

This invention relates generally to kitchen accessories, and, more particularly, to cutting boards.

BACKGROUND OF THE INVENTION

A common problem with cutting boards is that they are hard to pick up off a work surface. The conventional cutting board is a simple planar body, with no vertical features other than the thickness of the slab. In typical use, small pieces of chopped and cut ingredients on the board must be carefully transferred to cooking vessels or serving containers, which requires that the board be picked up and deftly maneuvered with one hand. Various solutions to the problem have been tried in the past, including handle holes in the slab and raised perimeters, but none has been effective to enable the easy, one-handed pick up and maneuvering required.

SUMMARY OF THE INVENTION

A cutting board has a main cutting surface and a handle extending from the main cutting surface and vertically spaced above the main cutting surface.

BRIEF DESCRIPTION OF DRAWINGS

A more complete understanding of the invention and its advantages will be apparent from the Detailed Description taken in conjunction with the accompanying Drawings, in which.

DETAILED DESCRIPTION

Figure 1:
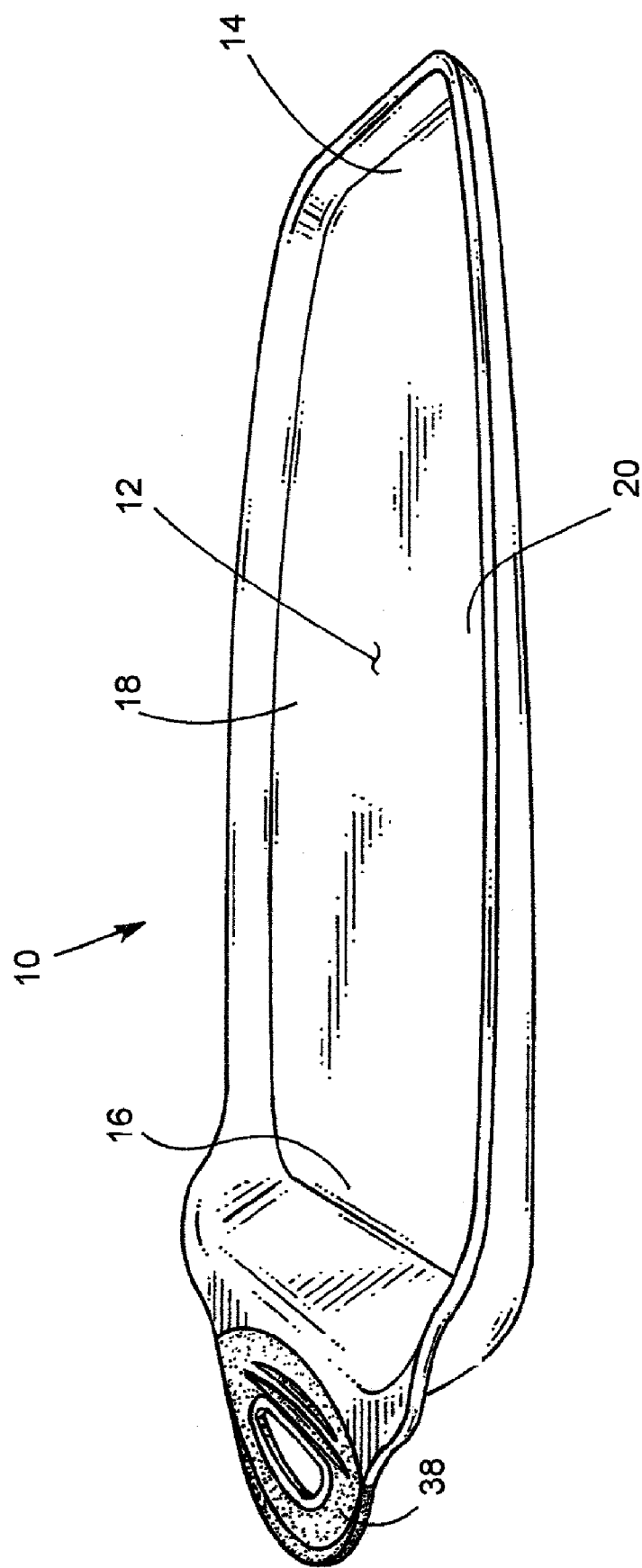
FIG. 1 is a perspective view of the cutting board scoop of the present invention.
Figure 2:
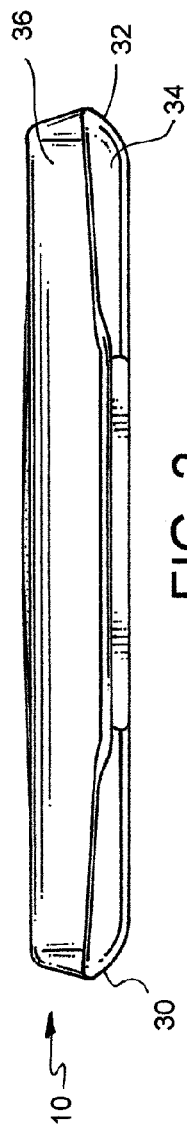
FIG. 2 is a front elevational view thereof.
Figure 3:
FIG. 3 is a rear elevational view thereof.
Figure 4:
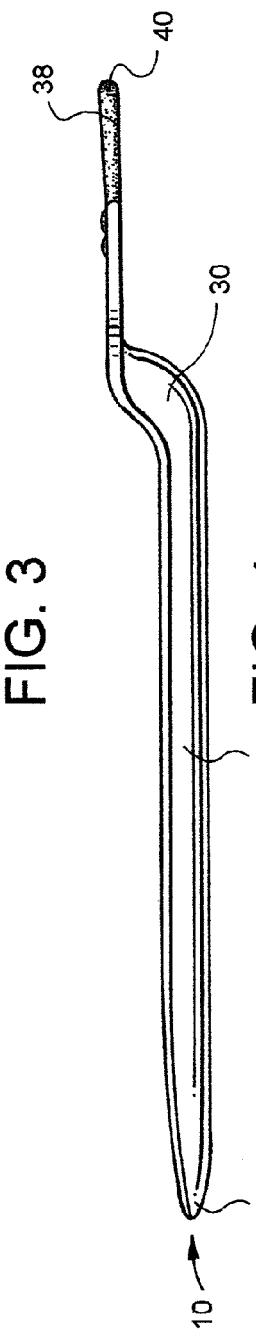
FIG. 4 is a left side elevational view thereof.
Figure 5:
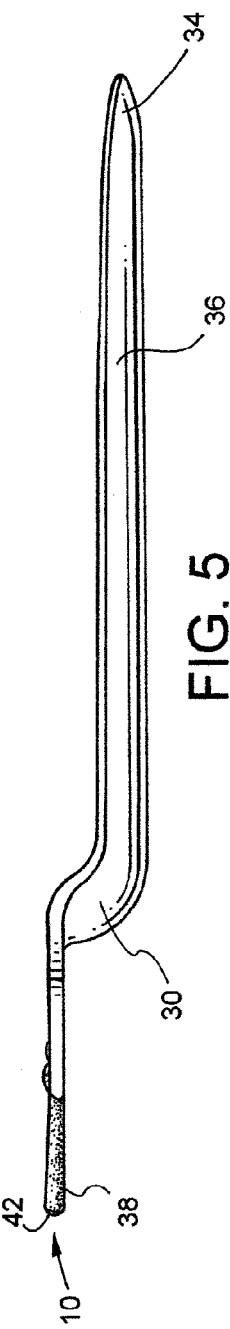
FIG. 5 is a right side elevational view thereof.
Figure 6:
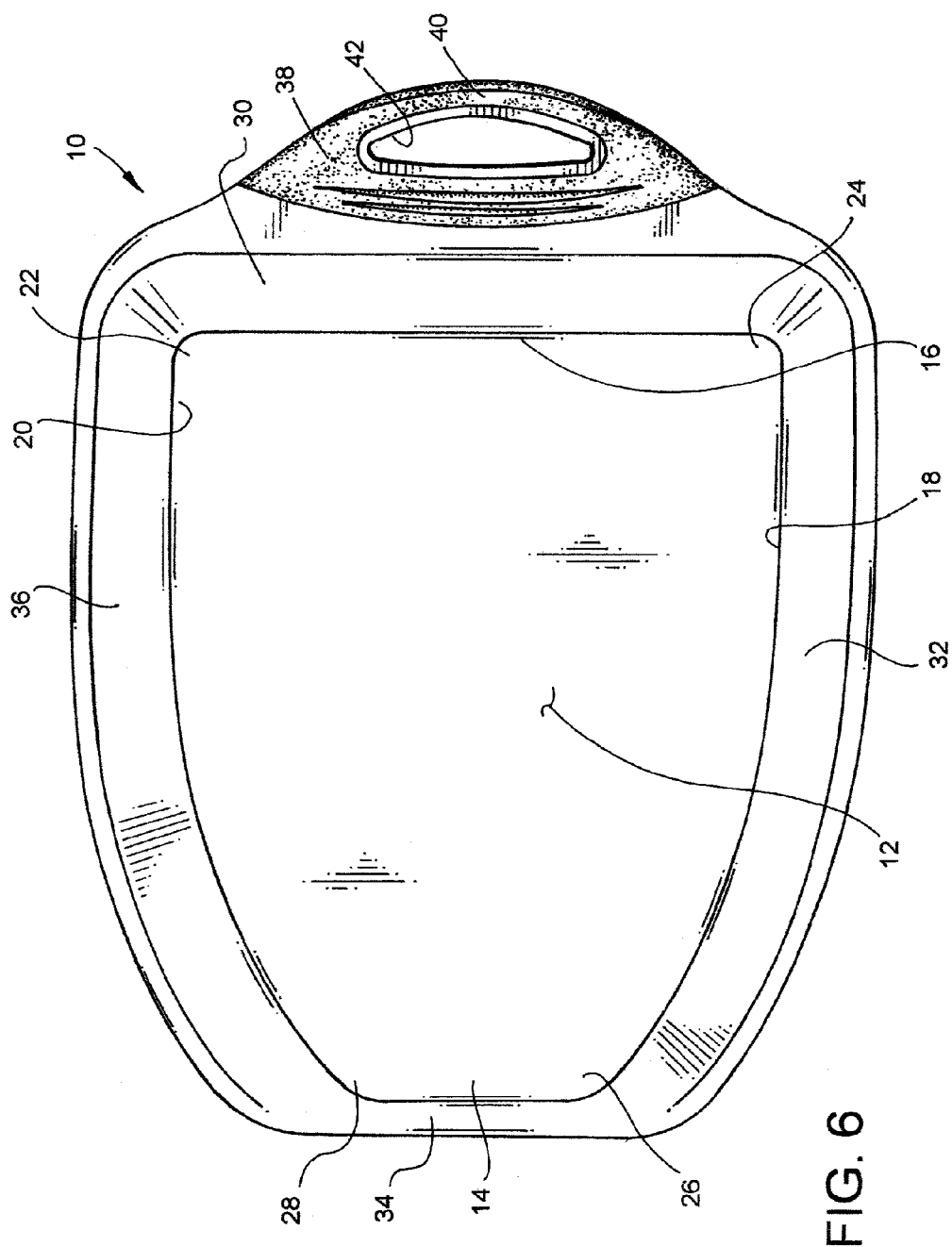
FIG. 6 is a top plan view thereof.
Figure 7:
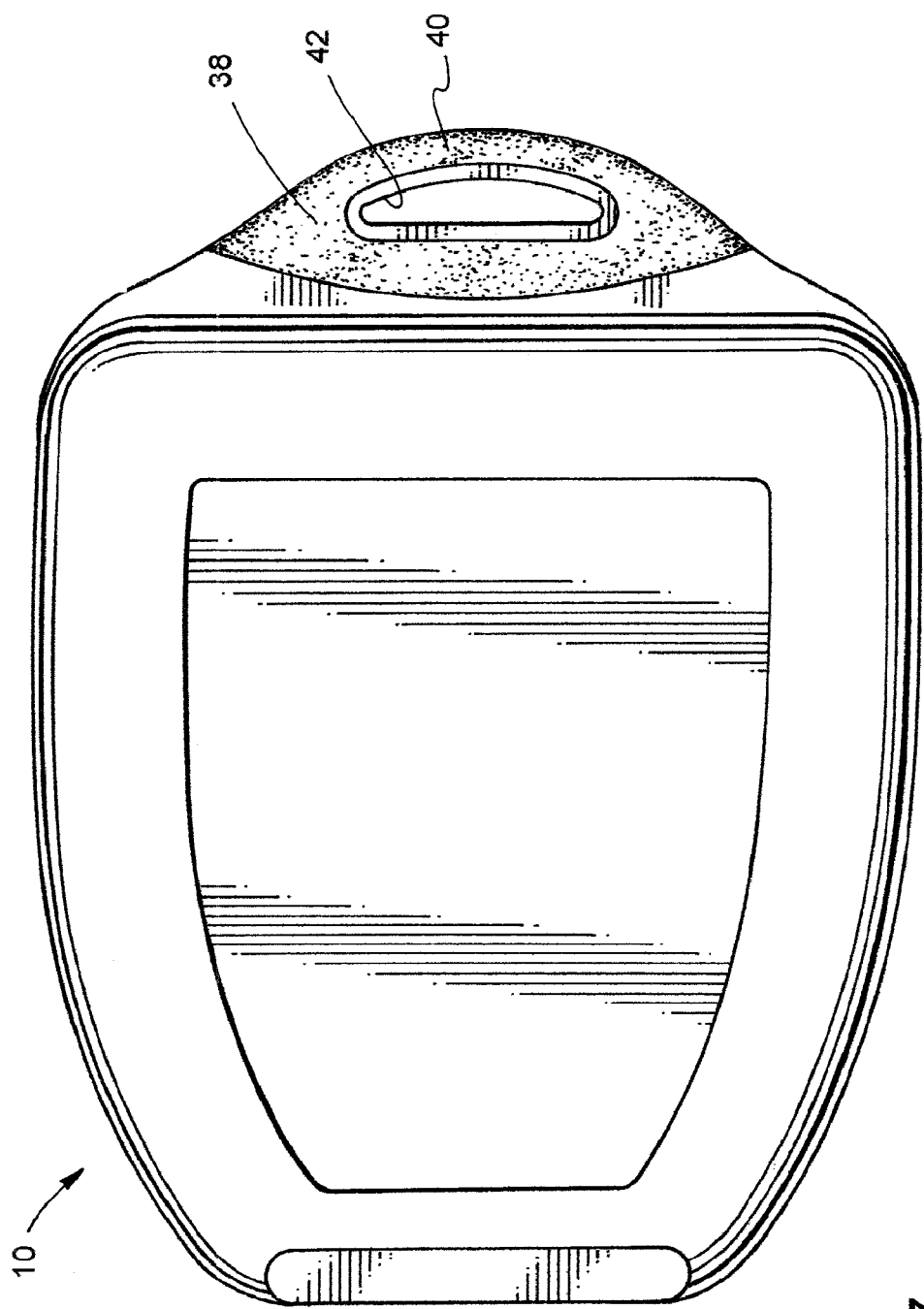
FIG. 7 is a bottom plan view thereof.

Referring to FIGS. 1-7, where like numerals refer to like and corresponding parts, a cutting board scoop 10 includes a main cutting surface 12. Main cutting surface 12 is generally rectangular with two ends 14,16 and two sides 18,20. The sides 18,20 are longer than the ends 14,16. The sides 18,20 and ends 14,16 are joined by rounded corners 22,24,26,28. The sides 18,20 are generally parallel to each other, the ends 14,16 are generally parallel to each other, and the sides 18,20 and ends 14,16 are generally perpendicular to each other.

One end 14 of the main cutting board surface 12 is shorter than the other end 16, such that the main cutting board surface 12 is tapered from the longer end 16 to the shorter end 14. The main cutting board surface 12 is symmetrical in a direction parallel to the sides 18,20.

Curled edges 30,32,34,36 extend upwardly from the sides 18,20 and ends 14,16 of the main cutting surface 12. The curled edges 34,32,36 of the shorter end 14 and sides 18,20 being relatively shallow compared to a deeply-curled edge 30 of the longer end 16.

A handle 38 is vertically spaced above the main cutting surface 12 about 1.25 inches. The handle 38 is a planar element parallel to the main cutting board surface 12 and extending from the deeply-curled edge 30 of the main cutting surface 12. The handle 38 is generally triangular with a curved outermost corner 40. Walls 42 define an opening in the handle 38.

In operation, the vertical spacing of the handle of about 1.25 inches is optimal for allowing a user's fingers to slip under the handle for gripping with the thumb on top. This construction gives a scoop-like appearance, though scooping is not a normal function of a cutting board.

It will be understood that each of the elements described above, or two or more together, may also find a useful application in other types of constructions differing from the type described above.

While the invention has been illustrated and described as embodied in a particular cutting board, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A cutting board, comprising:
   a main cutting surface;
   a handle extending from the main cutting surface and vertically spaced above the main cutting surface;
   with the main cutting surface being generally rectangular with two ends and two sides, the sides being longer than the ends;
   with the sides and ends being joined by rounded corners;
   with the sides being parallel to each other, the ends being parallel to each other, and the sides and ends being perpendicular to each other; and
   with one end of the main cutting board surface being shorter than the other end such that the main cutting board surface is tapered from the longer end to the shorter end, the main cutting board surface being symmetrical in a direction parallel to the sides.

2. A cutting board, comprising:
   a main cutting surface;
   a handle extending from the main cutting surface and vertically spaced above the main cutting surface;
   with the main cutting surface being generally rectangular with two ends and two sides, the sides being longer than the ends;
   with one end of the main cutting board surface being shorter than the other end such that the main cutting board surface is tapered from the longer end to the shorter end, the main cutting board surface being symmetrical in a direction parallel to the sides.

3. A cutting board, comprising:
   a main cutting surface;
   the main cutting surface being generally rectangular with two ends and two sides;
   curled edges extending upwardly from the sides and ends of the main cutting surface;

a handle extending from one curled edge of the main cutting surface and vertically spaced above the main cutting surface;

with the sides being longer than the ends; and with the curled edges of the shorter end and sides being relatively shallow compared to a deeply-curled edge of the longer end.

4. The cutting board of claim 3 with the handle extending from the deeply curled edge and vertically spaced above the main cutting surface about 1.25 inches.

5. The cutting board of claim 4 with the handle being a planar element parallel to the main cutting board surface.

6. The cutting board of claim 5 with the handle being generally triangular with a curved outermost corner.

7. The cutting board of claim 6 with walls defining an opening in the handle planar element.

8. A cutting board, comprising:

a main cutting surface;

the main cutting surface being generally rectangular with two ends and two sides, the sides being longer than the ends, the sides and ends being joined by rounded corners, the sides being parallel to each other, the ends being parallel to each other, and the sides and ends being perpendicular to each other;

one end of the main cutting board surface being shorter than the other end such that the main cutting board surface is tapered from the longer end to the shorter end, the main cutting board surface being symmetrical in a direction parallel to the sides;

curled edges extending upwardly from the sides and ends of the main cutting surface; the curled edges of the shorter end and sides being relatively shallow compared to a deeply-curled edge of the longer end;

a handle vertically spaced above the main cutting surface about 1.25 inches, the handle being a planar element parallel to the main cutting board surface and extending from the deeply-curled edge of the main cutting surface, with the handle being generally triangular with a curved outermost corner, with walls defining an opening in the handle planar element.

* * * * *